United States Patent
Goodnight et al.

(10) Patent No.: US 6,504,474 B1
(45) Date of Patent: Jan. 7, 2003

(54) METHOD AND APPARATUS FOR DETECTING A RESTRICTED OR BYPASSED TRANSMISSION OIL FILTER

(75) Inventors: Trent Lynn Goodnight, Hudson, IA (US); Douglas Rene Johnson, Waterloo, IA (US); Gregory Evan Sparks, Hudson, IA (US)

(73) Assignee: Deere & Company, Moline, IL (US)

( * ) Notice: Subject to any disclaimer, the term of this patent is extended or adjusted under 35 U.S.C. 154(b) by 202 days.

(21) Appl. No.: 09/614,202

(22) Filed: Jul. 12, 2000

(51) Int. Cl.[7] .............................................. B60Q 1/00
(52) U.S. Cl. ................... 340/439; 340/439; 340/451; 340/607; 340/626; 137/87.04
(58) Field of Search ........................... 340/439, 438, 340/451, 450.2, 450.3, 607, 626; 210/85, 90; 123/479, 196 S; 137/87.04

(56) References Cited

U.S. PATENT DOCUMENTS

| 3,790,931 A | | 2/1974 | Leveraus ..................... 210/451 |
| 3,996,137 A | * | 12/1976 | Cooper ........................ 210/130 |
| 4,626,344 A | | 12/1986 | Fick et al. ..................... 210/90 |
| 4,685,066 A | | 8/1987 | Hafele et al. ................. 210/90 |
| 5,205,261 A | * | 4/1993 | Betts, Jr. et al. ............ 123/690 |
| 5,239,861 A | * | 8/1993 | Fujita et al. ................. 340/607 |
| 5,681,988 A | * | 10/1997 | Koch et al. .................. 340/451 |
| 5,702,592 A | * | 12/1997 | Suri et al. ..................... 210/90 |

FOREIGN PATENT DOCUMENTS

EP        0 408 758        12/1989

* cited by examiner

Primary Examiner—Donnie L. Crosland

(57) ABSTRACT

A method and apparatus for detecting a restricted or bypassed transmission oil filter by providing pressure transducers on both sides of the oil filter whereby the pressure differential will indicate the extent of filter restriction. A first alarm is activated at a first pressure differential to indicate a restricted filter and the need for filter replacement. A second, higher level, alarm is activated to indicate the filter is bypassed and the engine is reduced in speed to allow the pressure and the pressure differential to drop to the point that the filter is no longer bypassed. This enables the vehicle to be operated with limited capabilities to allow the vehicle to be driven to the shop for filter replacement. If the lowered engine speed is insufficient to reduce the pressure differential to stop the bypass, then the engine speed is further reduced to a low idle and the transmission shifted to neutral. The filter must be replaced before the vehicle is can be operated again to prevent damage to the hydrostatic unit in the transmission.

3 Claims, 1 Drawing Sheet

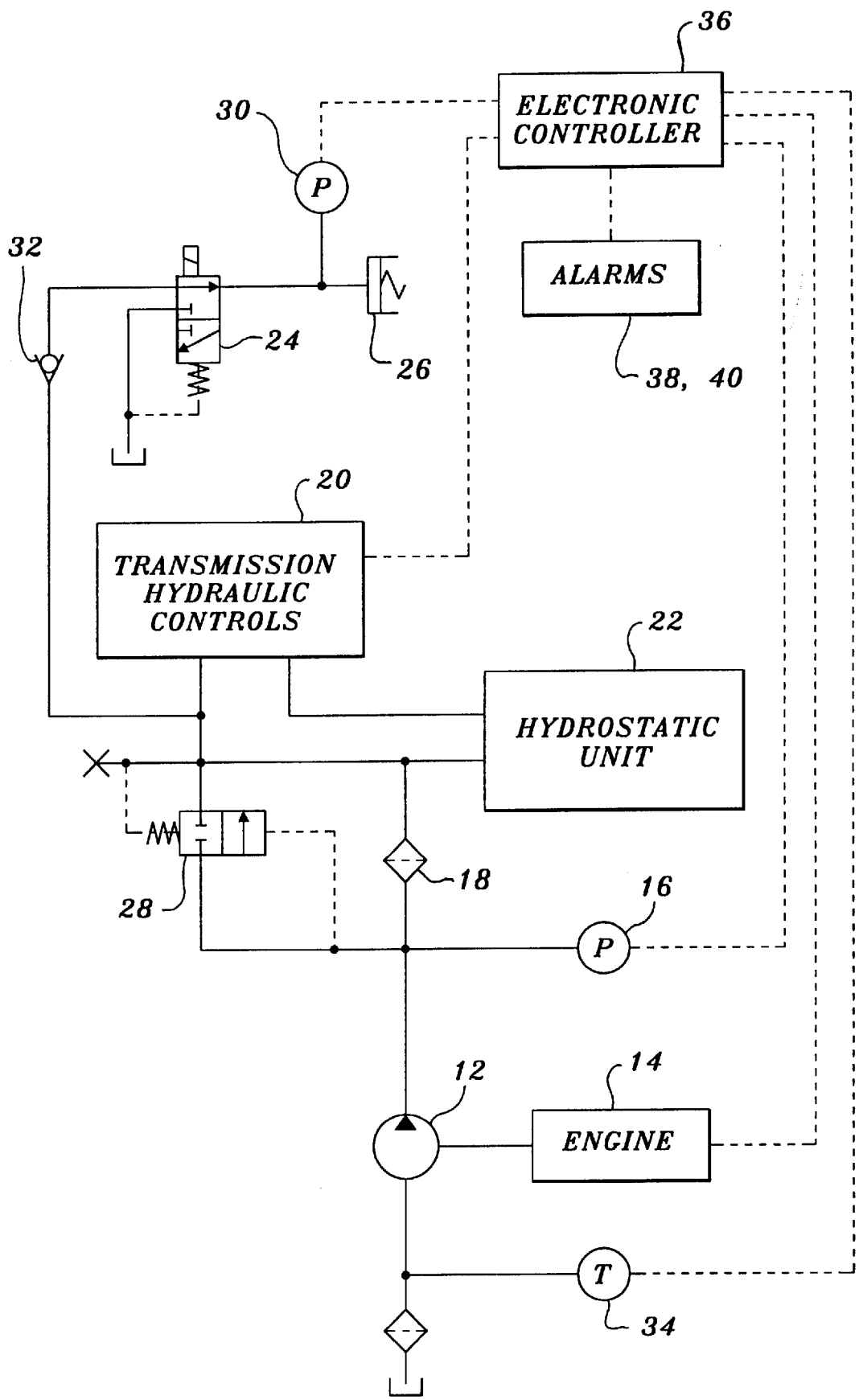

METHOD AND APPARATUS FOR DETECTING A RESTRICTED OR BYPASSED TRANSMISSION OIL FILTER

BACKGROUND OF THE INVENTION

1. Field of the Invention

The present invention relates to a method and apparatus for warning a vehicle operator of the need to replace a transmission oil filter due to filter restriction or filter bypassing.

2. Description of the Related Art

The hydrostatic unit of an infinitely variable, hydromechanical transmission is susceptible to damage if the oil is contaminated by particles. Oil filters are used to remove contaminants from the oil. However, to enable continued operation of the vehicle, such as an agricultural tractor, a bypass valve is also provided that will automatically open in the event the filter is excessively restricted. The current state of the art for detecting filter restriction is with a pressure switch that only indicates when the filter is restricted by more or less than a fixed value. The switch can not indicate whether or not the filter is restricted to the point of bypass. As a result, the transmission controller can not do any more to protect the transmission than to turn on an indicator light to signal a restricted filter. If the operator chooses to ignore the warning, then the vehicle can continue to be operated until the filter is bypassed and debris is passed through sensitive hydraulic components.

SUMMARY OF THE INVENTION

It is an object of the present invention to provide a method and apparatus for warning the operator that the filter has become restricted, for further warning if the filter is bypassed and for taking preventative measures to close the bypass valve before any damage occurs.

The transmission is equipped with a pair of pressure transducers in addition to the filter and the bypass valve. One pressure transducer measures the pump pressure at the pump outlet while the other transducer is at the filter outlet. In a preferred embodiment, the second pressure transducer is located adjacent the park brake to measure the pressure in the park brake piston. However, this second pressure transducer can be located anywhere that will measure the pressure at the filter outlet. The outputs of the two pressure transducers are directed to an electronic controller that compares the two pressure measurements and takes appropriate action to activate alarms, depending on the magnitude of the pressure differential across the filter.

A first alarm will be activated when the filter is partially restricted, enabling the operator to continue operating the tractor and schedule maintenance. If the pressure differential exceeds a second higher level, indicating a bypassed filter, the controller will activate a second, more serious, alarm. The controller will also reduce the engine speed, thereby reducing the pump outlet pressure whereby the pressure differential across the filter will hopefully be reduced to the point that the bypass valve will close. In the event the bypass valve does not close, the controller will reduce the engine speed to a low idle until the engine is shut down and will shift the transmission to neutral, thereby forcing action to be taken. This prevents continued operation of the transmission with the bypass valve opened and the possibility for damage of the hydrostatic unit.

The alarms are only activated when the oil temperature is above a predetermined level, such as 20° C. A greater pressure differential across the filter will occur due to the higher viscosity of cold oil. Thus, when the oil is cold the pressure differential is not indicative of a restricted or bypassed filter.

The use of two pressure transducers produces an accurate measure of the extent of filter restriction. An accurate measurement allows for the use of more sophisticated software to activate alarms rather than a simple differential pressure switch. Furthermore, a downstream pressure transducer can be used to diagnose leaks or other problems in the transmission. Multiple alarms may be activated for varying degrees of filter restriction instead of the single, restricted filter alarm previously known. A gauge display can also be employed to show the ongoing filter status.

BRIEF DESCRIPTION OF THE DRAWING

The drawing is a schematic representation of a portion of a transmission hydraulic circuit together with the electronic controller.

DESCRIPTION OF THE PREFERRED EMBODIMENT

The transmission hydraulic circuit includes a pump 12 driven by the vehicle engine 14 through the transmission input shaft. A pressure transducer 16 is located at the pump outlet for measuring the pump pressure. From the pump 12, hydraulic fluid flows through a filter 18 and from there to the remainder of the transmission including the transmission hydraulic controls 20, the hydrostatic unit 22, the park brake release valve 24 and the park brake release piston 26. A filter bypass valve 28 is parallel with the filter 18 and is designed to open when the pressure differential across the filter reaches a predetermined limit, e.g. 550 kPa+/−50 kPa.

Downstream from the filter 18 is a second pressure transducer 30. In the drawing, the second pressure transducer 30 is located adjacent to the park brake release piston to measure the fluid pressure at the park brake release piston. The pressure drop between the outlet of the filter 18 and the park brake piston is negligible and thus the output of the transducer 30 is indicative of the pressure at the outlet of the filter 18. The pressure transducer 30 could be located immediately adjacent to the filter 18 outlet if desired. A temperature transducer 34 at the inlet side of the pump 12 provides a measurement of the transmission oil temperature.

An electronic controller 36 receives inputs from the pressure transducers 16 and 30 as well as the temperature transducer 34. The controller 36 also receives and sends signals to and from the engine 14, including engine speed. The controller 36 activates the alarms 38 described below in greater detail. With the two pressure signals, an accurate pressure differential is measured to indicate the extent of filter restriction.

When the engine is operating at a speed greater than 800 rpm, the pump 12 is operating at a high enough speed that the pressure differential across the filter provides a meaningful indication of the filter restriction. If the transmission oil temperature is low, for example below 20° C., the increased oil viscosity may produce a large pressure differential across the filter even when the filter is not restricted. Thus, the oil temperature must be greater than 20° C. for the pressure differential to indicate the extent of filter restriction. The controller is programmed such that if the pressure differential across the filter is greater than 350 kPa, the engine speed is greater than 800 rpm, the oil temperature above 20° C. and these conditions have existed for a minimum length of time, such as three seconds, an alarm 38 is activated. This alarm indicates that the transmission oil filter is restricted and the filter should be replaced. The alarm is cleared when the above conditions no longer exist.

A second, higher level, alarm 40 is activated if the pressure differential exceeds 500 kPa, the lowest level at which the bypass valve can open. If the engine speed is greater than 1500 rpm, the oil temperature is greater than 20° C., the park brake is released for at least five seconds and the pressure differential is greater than 500 kPa then the second alarm is activated until 5 seconds after these conditions no longer exist. Once the alarm is activated, the controller will scale down the engine throttle so that the maximum engine speed is reduced to 1500 rpm.

When the engine speed is reduced to below 1500 rpm, the pump 12 speed will be reduced, thus lowering the pressure in the hydraulic system. By lowering the hydraulic system pressure, the pressure differential across the filter 18 should be reduced as well. This will enable the bypass valve to close so the oil is again filtered. The reduced engine speed will allow the vehicle to be moved, but will reduce its ability to perform work and thereby encourage the operator to change the oil filter immediately.

If, after the engine speed has been reduced to less than 1500 rpm, the pressure differential of more than 500 kPa persists for longer than three seconds, then the electronic controller will reduce the engine speed to a low idle speed and shift the transmission into neutral until the filter is replaced. This prevents continued operation of the transmission with the filter bypassed.

The use of two pressure transducers provides greater accuracy in assessing the condition of the filter and enables the provision of warning alarms to the operator that service is needed prior to reaching the point where the filter is bypassed and damage is occurring to the hydrostatic unit. By activating a first alarm before the filter is bypassed the operator will still be able to use the vehicle while filter replacement is scheduled. Furthermore, by stopping the transmission when the filter remains bypassed, damage can be prevented.

While the invention is shown and described in the context of an infinitely variable hydro-mechanical transmission, the invention can be used in any hydraulic system having components that are sensitive to contamination. The invention should not be limited to the above-described embodiment, but should be limited solely by the claims that follow.

What is claimed is:

1. A method of warning a vehicle operator of the need to service a vehicle transmission having a hydraulic pump and filter downstream from the pump and a filter bypass valve, the method comprising the steps of:

sensing a first pressure on a first side of the filter and a second pressure on a second side of the filter;

comparing the first and second pressures to determine a pressure differential across the filter;activating activating a first alarm when the pressure differential exceeds a first predetermined value;

opening the filter bypass valve in the event the pressure differential across the filter exceeds a second predetermined value and wherein the first predetermined value is less than the second predetermined value whereby the first alarm is activated prior to the filter being bypassed and wherein the first alarm is activated only when the transmission input speed is above a first predetermined speed level and the transmission oil temperature is above a predetermined amount;

activating a second alarm when the pressure differential across the filter exceeds the second pressure by a third predetermined value wherein if the engine speed is above a second predetermined speed level when the second alarm is activated, the engine speed is reduced to below the second predetermined speed level whereby the pump pressure is reduced;

reducing the engine speed to a low idle speed if after the engine speed is reduced to below the second predetermined speed level the pressure differential across the filter remains above the third predetermined value; and, wherein the second and third predetermined values are approximately equal whereby the second alarm is activated when the filter is bypassed.

2. A method of preventing damage to a vehicle transmission from contaminants in a hydraulic system, the transmission having a hydraulic pump and filter, the method comprising the steps of:

sensing a first pressure on a first side of the filter and a second pressure on a second side of the filter;

comparing the first and second pressures to determine a pressure differential across the filter;

in the event the pressure differential exceeds a predetermined value and a transmission input speed is above a predetermined speed, activating an alarm to a vehicle operator and reducing the input speed; and, further reducing the input speed and shifting the transmission to neutral in the event the pressure differential continues to exceed the predetermined value after the input speed has been reduced.

3. In a vehicle having an engine, transmission and electronic controller, the transmission having a hydraulic pump, filter, and filter bypass valve, a first pressure transducer in communication with a pump outlet for measuring a pump pressure and a second pressure transducer in communication with a filter outlet for measuring a pressure at the filter outlet wherein the electronic controller determines a pressure differential across the filter and at least one alarm activated by the electronic controller based on the pressure differential across the filter and wherein the second pressure transducer is also in communication with a park brake release piston and measures an oil pressure at the park brake release piston and wherein one alarm is activated when the pressure differential indicates a restricted valve and a second alarm is activated when the pressure differential reaches a value at which the filter bypass valve will open.

\* \* \* \* \*